US007756023B2

(12) United States Patent
Fuss

(10) Patent No.: US 7,756,023 B2
(45) Date of Patent: Jul. 13, 2010

(54) ADAPTIVE PHYSICAL TRANSMISSION MODE SELECTION

(75) Inventor: Michael Johannes Fuss, Allmersbach (DE)

(73) Assignee: Ericsson AB, Stockholm (SE)

(*) Notice: Subject to any disclaimer, the term of this patent is extended or adjusted under 35 U.S.C. 154(b) by 392 days.

(21) Appl. No.: 10/596,282

(22) PCT Filed: Dec. 8, 2004

(86) PCT No.: PCT/EP2004/053359

§ 371 (c)(1),
(2), (4) Date: Nov. 28, 2007

(87) PCT Pub. No.: WO2005/057836

PCT Pub. Date: Jun. 23, 2005

(65) Prior Publication Data

US 2008/0123688 A1 May 29, 2008

(30) Foreign Application Priority Data

Dec. 8, 2003 (DE) ................................ 103 57 522

(51) Int. Cl.
H04L 12/26 (2006.01)
H04J 3/16 (2006.01)
H04B 1/00 (2006.01)
(52) U.S. Cl. ..................... 370/230; 370/468; 455/69
(58) Field of Classification Search ............... None
See application file for complete search history.

(56) References Cited

U.S. PATENT DOCUMENTS 5,953,338 A * 9/1999 Ma et al. ............... 370/395.21

(Continued)

FOREIGN PATENT DOCUMENTS

WO WO 00/76114 12/2000

(Continued)

OTHER PUBLICATIONS

Mohammadi A et al. "An Adaptive MQAM Modulator for Fixed Wireless ATM Networks." ICC 2001. IEEE International Conference on Communications. Conference Record. Helsinky, Finland, Jun. 11-14, 2001, IEEE International Conference on Communication, New York, NY: IEEE, US, vol. 1 of 10, Jun. 11, 2001, pp. 1391-1395, XP010553774. ISBN: 0-7803-7097-1.

Primary Examiner—Steven H Nguyen
(74) Attorney, Agent, or Firm—Coats & Bennett, P.L.L.C.

(57) ABSTRACT

A data transmission network comprises two groups of nodes (1; 2, 3, 4), a radio interface associated to each group and connected to the nodes (1) of the group and a radio path (5) between the two radio interfaces (9), in which several groups ($14_{12}$, $14_{13}$, $14_{14}$) of virtual paths (15) of warranted bandwidth are transmitted between one node (1) of the first group and one node (2, 3, 4) of the second group. The sum of the bandwidths warranted to the groups ($14_{12}$, $14_{13}$, $14_{14}$) of virtual paths does not exceed the total bandwidth of the radio path (5) when operated in a transmission mode referred to as basic mode. The radio interfaces (9) support several physical transmission modes of different bandwidths and are adapted to detect the transmission quality of the radio path (5) and to operate, the transmission quality of the radio path (5) permitting, the radio path (5) in a transmission mode of higher bandwidth than that of the basic mode and to use the bandwidth difference between the used mode and the basic mode for bandwidth need of the groups of virtual paths in excess of the warranted bandwidth.

8 Claims, 1 Drawing Sheet

U.S. PATENT DOCUMENTS

Figure 1:
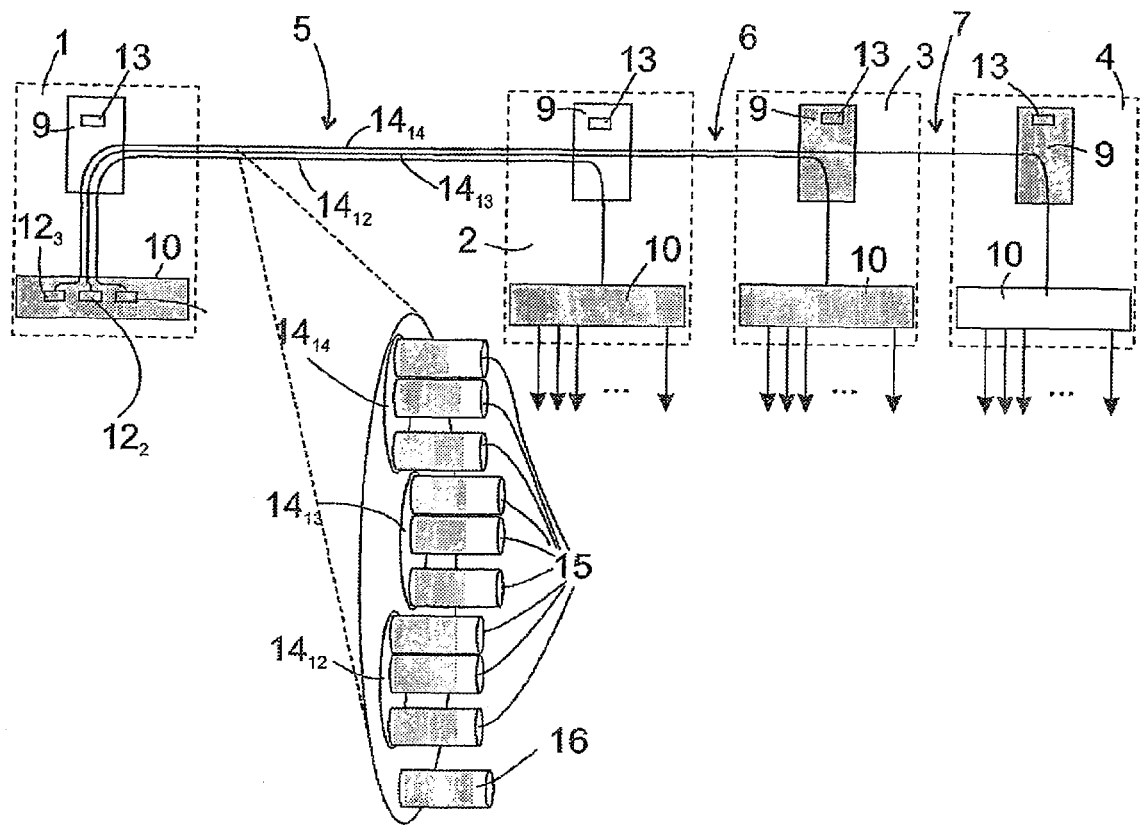

| | | | |
|---|---|---|---|
| 6,005,852 A * | 12/1999 | Kokko et al. | 455/509 |
| 6,097,722 A * | 8/2000 | Graham et al. | 370/395.21 |
| 6,314,103 B1 * | 11/2001 | Medhat et al. | 370/395.2 |
| 6,542,736 B1 * | 4/2003 | Parkvall et al. | 455/452.2 |
| 6,574,222 B1 * | 6/2003 | Medhat et al. | 370/395.1 |
| 6,748,220 B1 * | 6/2004 | Chow et al. | 455/450 |
| 7,016,375 B1 * | 3/2006 | Rosenberg et al. | 370/468 |
| 7,058,027 B1 * | 6/2006 | Alessi et al. | 370/310.1 |
| 7,443,830 B2 * | 10/2008 | Engels et al. | 370/347 |
| 2002/0105906 A1 * | 8/2002 | Marjelund et al. | 370/229 |
| 2004/0057394 A1 * | 3/2004 | Holtzman | 370/317 |
| 2004/0246891 A1 * | 12/2004 | Kay et al. | 370/215 |

FOREIGN PATENT DOCUMENTS

| | | |
|---|---|---|
| WO | WO 03/034639 | 4/2003 |

* cited by examiner

ADAPTIVE PHYSICAL TRANSMISSION MODE SELECTION

The present invention relates to a method for transmitting data in a network and a network in which such a method is applicable.

Modern telecommunication networks must support a plurality of different services, which differ in their quality requirements, e.g. concerning their bandwidth needs, admissible signal transmission delays, variability of the data rate etc. New telecommunication standards such as ATM (Asynchronous Transfer Mode) take account of this need in that they allow so-called virtual paths to be defined, in a unitary transmission infrastructure, in which data from many individual communications between terminals connected to the network which have the same quality requirements may be transmitted between nodes of the network.

Since the abolition of the telecommunication monopoly, a large number of private providers of telecommunications services have appeared on the market, which, at least in part, share an existing telecommunication infrastructure, e.g. by permanently hiring a certain portion of the bandwidth of an existing transmission line in order to provide it to their clients for their terminal-to-terminal communications. The degree of capacity utilisation that can be reached on such a transmission line is not improved by dividing it between different providers. As long as the transmission line is under the control of a single provider, he may allow additional terminal-to-terminal connections to be established via the transmission line, until its total capacity is no longer sufficient to accommodate therein a further connection. However, if the transmission line is hired to various providers, each one of them can only allow terminal-to-terminal connections within the bandwidth hired by him; new connections that would cause the hired capacity to be exceeded cannot be allowed, even if a bandwidth portion hired by another provider is partially idle.

In U.S. Pat. No. 6,097,722 it is suggested to allow providers, which use several groups of virtual paths in an ATM transmission line, to temporarily exceed the bandwidth hired by them by "lending" them bandwidth, which belongs to another provider but is presently not used by him. It must be possible to return this lent bandwidth to its "proprietor" at any time, if he claims it, so that the lender must not use it for high-value services which require continuously available bandwidth or short signal transmission delays.

The object of the present invention is to provide a method for data transmission in a network and a network appropriate for carrying out the method, where a transmission line is simultaneously used by several users, each of whom has been warranted part of the total bandwidth of the transmission line for his exclusive use at any time. The method and network permit allocation to a user of bandwidth beyond the warranted extent with an increased availability and which will eventually enable use of this additionally provided bandwidth for high-value services.

The invention is based on the use of a radio path as the transmission path and on the fact that the transmission quality on a radio path depends on conditions that vary with time, such as the climatic conditions reigning around it, interferences of several propagation paths or jammers at a same frequency. In order to ensure a required high availability of the radio path of 100%-e (i.e. the radio path must be available with a specified bandwidth during a portion of 100%-e of the operating time of the network, e being much smaller than 1%), a physical transmission mode, i.e. a combination of modulation and coding, must be used on the radio path which is operable even under very unfavourable climatic conditions. Only during a portion e of the operating time of the radio path, the climatic conditions may be so bad that they cause a disturbance of the transmission on the radio path. The higher the availability requirements are, the more robust must the physical transmission mode be chosen, and the greater is the bandwidth difference between this transmission mode, referred to as basic mode, and a less robust but faster mode, which might be used under favourable climatic conditions.

According to the invention, by monitoring the transmission quality of the radio path and, transmission quality of the radio path permitting, operating it under a transmission mode having a higher bandwidth than the basic mode, at least temporarily additional bandwidth is obtained which may be used for temporary bandwidth needs of a provider which exceed the portion of the total bandwidth of the radio path in basic mode which has been hired by him and warranted to him. The higher the required availability is, i.e. the smaller e is, the higher is the probability that at an arbitrarily chosen instant additional bandwidth may be generated by using a faster mode than the basic mode.

According to a first simple embodiment of the method, the radio path is permanently operated under the physical transmission mode, which has the highest bandwidth among the transmission modes that are compatible with the detected transmission quality of the radio path. This method requires a continuous adaptation of the transmission mode to the climatic conditions, but if a provider needs bandwidth in excess of the portion hired by him, the highest bandwidth achievable under the given conditions is available at all times.

According to an alternative second embodiment of the method, among the transmission modes compatible with a detected transmission quality of the radio path, the used one is the most robust one, the bandwidth of which satisfies the total bandwidth need, which is formed of the bandwidth hired by the individual providers and the bandwidth used by them in excess of the hired portion. Changes due to varying climatic conditions are less frequent here than in the first embodiment; here, the most frequent cause for changes of the transmission mode are fluctuations of the bandwidth need of the providers. An advantage of this method is that the radio path may always be operated at the lowest possible transmission power, so that jamming of other radio paths using a same frequency range is avoided.

A possible compromise is that if the total bandwidth need of the various providers is less than the bandwidth of the broadest one of the transmission modes compatible with the detected transmission quality of the radio path, the used transmission mode is the most robust one of the compatible transmission modes, the bandwidth of which covers the total bandwidth need plus a safety margin. The existence of the safety margin allows to satisfy from it bandwidth needs of the providers exceeding the hired portion for short times without before having to change the transmission mode.

A particularly advantageous possibility for adapting to small changes of the bandwidth need without having to change the transmission mode is an adaptation of the transmission power. In this way, if a switchover to a faster mode has been found to be necessary, as a preparation for this switchover the transmission power in the old mode may be increased for a short time in order to decrease the bit error rate and to decrease the number of cells which must be retransmitted due to a transmission error.

If various services are transmitted on the radio path, not all of which have a constant bit rate, is difficult to estimate the total bandwidth need from the service qualities that have been agreed for individual terminal-to-terminal connections. A simple possibility for estimating a discrepancy between the bandwidth of the presently used transmission mode and the total bandwidth need of the providers is the use of a buffer at the transmitter-side radio interface of the radio path in which data to be transmitted is buffered, wherein it is found that the presently used transmission mode does not satisfy the total bandwidth need if the filling level of the buffer exceeds a predefined limit.

Since the dwell time of the buffered data in the buffer cannot be easily specified, buffered data should only be that which belongs to virtual path having an unspecified bit rate.

An admission control (call admission control, CAC) in which it is decided whether a new terminal-to-terminal connection is to be admitted or not is carried out for each group of virtual channels independently from the other groups.

Figure 2:
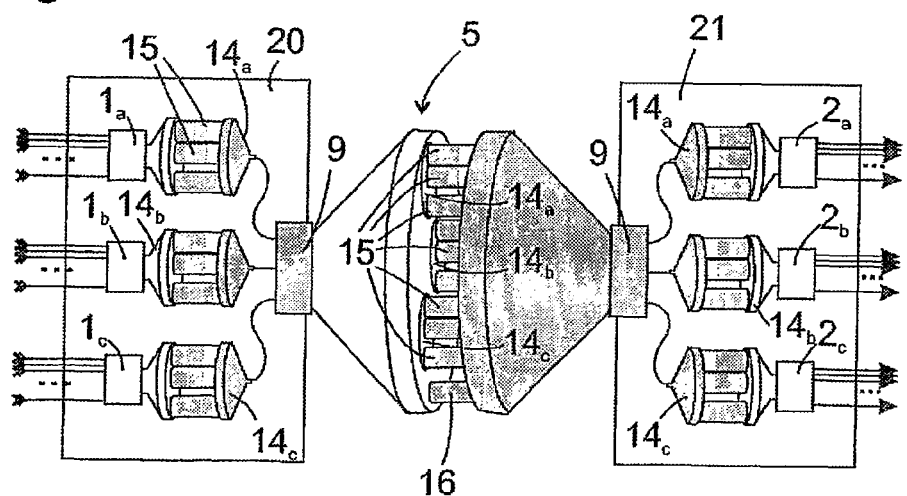

Further features and embodiments of the invention become apparent from the subsequent description of embodiments referring to the appended drawings:

FIG. 1 is a schematic block diagram of a first embodiment of a network according the invention; and FIG. 2 is a block diagram of a second embodiment of a network.

As a highly simplified example of a network according to the invention, in FIG. 1 a network is shown having four nodes 1, 2, 3, 4 which are daisy-chained to each other by radio paths 5, 6, 7, in which data is transmitted packed into ATM cells.

Each node 1 to 4 may be regarded as formed essentially of two components: a radio interface 9 and a terminal interface 10. The interfaces 9 and 10 are both bi-directional, but in the following, for the sake of simplicity, only one transmission direction is considered, i.e. the node 1 is described only in its function as a transmitter node, and the nodes 2 to 4 as receiver nodes.

A symbolic enlarged detail illustrates the data traffic on radio path 5 from node 1 to node 4. The data traffic on this radio path 5 is formed of three groups $14_{12}$, $14_{13}$, $14_{14}$ of virtual paths 15. The virtual paths 15 of each group extend between the same nodes 1, 2 or 1, 3 or 1, 4 and differ from each other in the agreed service quality of the communications transmitted in them between terminals connected to the nodes. Since only one transmission direction is considered, the terminals connected to a transmitter node 1 will also be referred to as sources, and the terminals connected to the receiver nodes 2, 3 or 4 as drains.

The part of the bandwidth of the radio path 5 which belongs to each individual group 14 is defined by agreement between an operator of the network and the telecommunication service provider who uses the concerned group 14, and the sum of these portions is not more than the total bandwidth of the radio path 5, when a combination of modulation and coding referred to as basic mode is used on the radio path 5.

Each pair of nodes 1+2, 1+3 and 1+4, respectively, may use the portion of the bandwidth of radio path 5 assigned to it freely and without coordination with the needs of the other node pairs. It must only be ensured before establishing a new communication between terminals of a pair of nodes that the requirement of this communication concerning the transmission quality may still be satisfied within the portion of the bandwidth of radio path 5 which is assigned to the concerned node pair. Methods to ensure this are known in the ATM field as Call Admission Control (CAC) and need not be explained here in detail. In FIG. 1, a CAC processor 12 is shown in the terminal interface of node 1 for each group 14 of virtual paths to which the node 1 is connected, but it is understood that these processors need not be present as multiple circuits but may be formed of a single circuit which carries out the CAC processing for the individual groups 14 in time multiplex.

If the CAC processing indicates that a new communication between terminals of nodes 1 and 2 cannot be established, because in the portion of the bandwidth of the basic mode which belongs to the group $14_{12}$, there is no more capacity available, this communication is not rejected by the terminal interface 10 of the invention, but instead the terminal interface 10 sends a request to a control unit 13 of the radio interface 9 of node 1 in order to find out if additional transmission capacity between nodes 1 and 2 can be provided.

The radio interfaces of the nodes 1 to 4 support a plurality of physical transmission modes, i.e. of combinations of modulation and coding, which vary in robustness and bandwidth, and are capable of establishing, besides the virtual paths 15 of the individual groups $14_{12}$, $14_{13}$, $14_{14}$, an additional virtual path 16 for traffic with variable or un-specified bit rate, which is not assigned to any other groups. Further, they comprise means for monitoring the transmission quality on the radio paths 5, 6, 7.

According to a first embodiment, the control unit 13 of node 1 selects, according to the transmission quality detected e.g. by measuring the signal-noise-ratio, the one among the supported transmission modes which has the highest bandwidth compatible with the detected quality of radio path 5 and uses it on radio path 5. I.e., although the bandwidth of the basic mode is only e.g. 15 Mb/s, at an instant when the control unit 13 receives the request of the terminal interface 10 for more transmission capacity for the group $14_{12}$, the transmission capacity of the radio path 5 may be e.g. 30 or 60 Mbit/s, because the transmission conditions are good and a less robust transmission mode with a high bandwidth is used. In this case, the control unit 13 responds positively to the request from the terminal interface 10.

Since the virtual path 16 does not have the availability 100%-e specified for the basic mode of the radio path 5, the required capacity cannot be permanently warranted to the terminal interface 10. It cannot therefore use the capacity of the virtual path 16 for communications at constant bit rate (CBR), but for those of variable bit rate (VBR) or unspecified bit rate (UBR), so that the requested communication may eventually still be admitted. If the communication to be established is UBR or VBR traffic, it may be conveyed on the virtual path 16; if it is CBR traffic, the terminal interface increases the portion of the bandwidth of group $14_{12}$ belonging to the virtual CBR path at the expense of the UBR or VBR paths of this group, and thus displaced UBR or VBR traffic is conveyed on the virtual path 16.

According to a second embodiment, the control unit 13 monitors the transmission quality, so that it is able at any time able to decide which presently possible combination of modulation and code has the highest transmission capacity, but it always uses the most robust one among the presently possible combinations, which is still sufficient to cope with the present data traffic. In this way the transmission power may be kept low in average, and the jamming of adjacent transmitters is kept small. To this effect, it comprises a transmission buffer in which data of the virtual UBR paths of the groups $14_{12}$, $14_{13}$, $14_{14}$ may be buffered before being transmitted, and means for monitoring a filling level of the transmission buffer. This transmission buffer enables the radio interface 9 to satisfy immediately a request of a terminal interface for more transmission capacity, even if the bandwidth of the transmission mode presently in use would probably not be sufficient to cope with the additional communication, by buffering in the transmission buffer the increase in data traffic caused by establishing the communication until the switchover to a faster transmission mode has been carried out. Herein, the filling level of the buffer is taken as a criterion for necessity of switching to another transmission mode; if it rises above a first critical limit, it is necessary to switch to a faster transmission mode in order to avoid an overflow; if it drops below a second, lower critical limit, the presently used mode is faster than necessary, and a more robust mode at lower transmission power can be used in its place.

According to an advanced embodiment, the control unit 13 also controls the transmission power on the radio path based on the bandwidth need. Short-term peaks of bandwidth need may be absorbed by increasing the transmission power above a set value, so as to decrease the bit error rate on the radio path 5 and to decrease the number of cells which must be retransmitted due to a transmission error. A criterion for this increase of transmission power is that, as described above, the filling level of the buffer exceeds a limit value. In order not to jam adjacent radio paths, the duration of the transmission power increase should be kept as small as possible. The control unit therefore switches to a faster transmission mode as soon as possible and reduces the transmission power to the set value again.

If the control unit 13 receives a request for additional transmission capacity e.g. for the group $14_{12}$, and the conditions for radio transmission are bad, so that no capacity in excess of the 14 Mbit/s of the basic mode is available on the radio path 5, the request must not yet necessarily be refused. Instead, in such a case the control unit 13 obtains the load level of the other groups $14_{13}$, $14_{14}$ of virtual paths from the CAC processors assigned to them in terminal interface 10, and if it is found that one of the other groups would still be capable of conveying the expected data rate of the additional communication, the control unit 13 permits the requesting terminal interface 10 to exceed its assigned portion of the bandwidth of the radio path, so that it can grant the communication request.

FIG. 2 is a schematic block diagram of a portion of a second embodiment of a network according to the invention. Two physical nodes 20, 21 are shown, which communicate with each other by a radio path 5. The physical nodes 20, 21 are divided by software means into a plurality of virtual nodes 1a, 1b, 1c and 2a, 2b, 2c, respectively, which are used by different providers a, b and c, respectively. Each virtual node is connected to terminals of clients of the respective provider and/or to other real or virtual nodes, not shown, of this provider's network. In view of the data transmission on radio path 5, the virtual nodes 1a, 1b, 1c correspond to a transmitter node 1 of FIG. 1, and the virtual nodes 2a, 2b, 2c correspond to the receiver nodes 2, 3, 4.

Radio interfaces 9 of nodes 20, 21 are identical to those of FIG. 1, and also the division of the bandwidth of the radio path 5 into several groups 14a, 14b, 14c of virtual paths 15, of which each group corresponds to the data traffic between a virtual transmitter node 1a, 1b, 1c and the radio interface 9 of the physical node 20 and between the radio interface 9 of the physical node 21 and one of the virtual receiver nodes 2a, 2b, 2c, respectively, and path 16 not assigned to any group is the same as in case of FIG. 1. Virtual nodes such as 1a, 2a of provider a communicate by an associated group 14a of virtual paths.

If a pair of virtual nodes such as 1a, 2a requires more transmission bandwidth than what corresponds to its associated group 14a of virtual paths, the handling is exactly the same as in case of the network described referring to FIG. 1.

The invention claimed is:

1. A method of transmitting data over a radio channel between two radio interfaces in a data transmission network that support a plurality of physical transmission modes at different bandwidths, the data transmission network comprising a first group of nodes having a first radio interface configured to support the plurality of physical transmission modes and a second group of nodes having a second radio interface configured to support the plurality of physical transmission modes, the method comprising:

establishing more than one group of virtual channels on the radio channel, each group having an allocated bandwidth to transmit data between the first and second groups of nodes, such that the sum of the allocated bandwidths does not exceed a total bandwidth of the radio channel operating in a basic transmission mode;

detecting a transmission quality of the radio channel;

based on the detected transmission quality, operating the radio channel in a selected transmission mode having a greater bandwidth than that of the basic transmission mode; and allocating the difference in the bandwidths between the selected transmission mode and the basic transmission mode to the groups of virtual channels such that one or more of the groups of virtual channels operate at a bandwidth that is greater than their allocated bandwidth.

2. The method of claim 1 wherein the selected transmission mode is the transmission mode having the highest bandwidth achievable given the detected transmission quality of the radio channel.

3. The method of claim 1 wherein if the bandwidth of the transmission mode having the highest bandwidth is greater than or equal to a total bandwidth need of the groups of virtual channels, the most robust transmission mode having a bandwidth sufficient to satisfy the bandwidth needs of the groups of virtual channels is selected.

4. The method of claim 3 further comprising altering the transmission power of the radio channel to satisfy small changes in the bandwidth needs of the groups of virtual channels.

5. The method of claim 3 further comprising buffering at least part of the data to be transmitted over a group of virtual channels, and determining that a bandwidth of a currently used transmission mode is less than the total bandwidth needs of the groups of virtual channels if the data in the buffer exceeds a predetermined limit.

6. The method of claim 5 wherein the buffered data comprises data that is to be transmitted over at least one virtual channel at an unspecified bit rate.

7. The method of claim 1 further comprising admitting a new terminal-to-terminal connection in a group of virtual channels based on a call admission control (CAC) method.

8. A data transmission network comprising:

a first group of nodes having a first radio interface configured to support a plurality of physical transmission modes;

a second group of nodes having a second radio interface configured to support the plurality of physical transmission modes;

a radio channel comprising more than one group of virtual channels interconnecting the first and second radio interfaces, each group being allocated a bandwidth to transmit data between the first and second groups of nodes such that the sum of the allocated bandwidths is less than or equal to a total bandwidth of the radio channel when the radio channel is operating in a basic transmission mode; and a control unit configured to:

detect a transmission quality of the radio channel;

operate the radio channel in a selected transmission mode having a greater bandwidth than that of the basic transmission mode based on the detected transmission quality; and allocate the difference in the bandwidths between the selected transmission mode and the basic transmission mode to the groups of virtual channels such that one or more of the groups of virtual channels operate at a bandwidth that is greater than their allocated bandwidth.

\* \* \* \* \*